(No Model.) 5 Sheets—Sheet 1.
W. S. BELDING.
DYNAMO.
No. 404,068. Patented May 28, 1889.
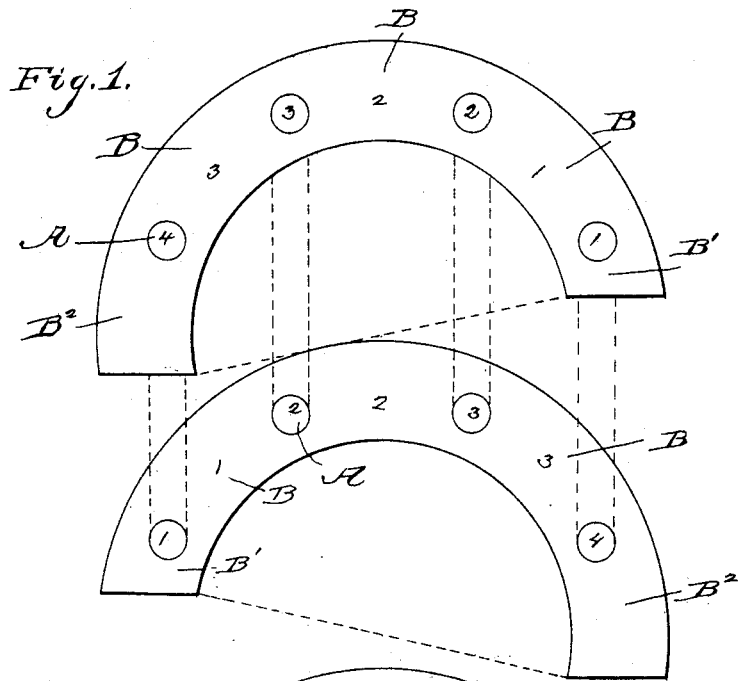
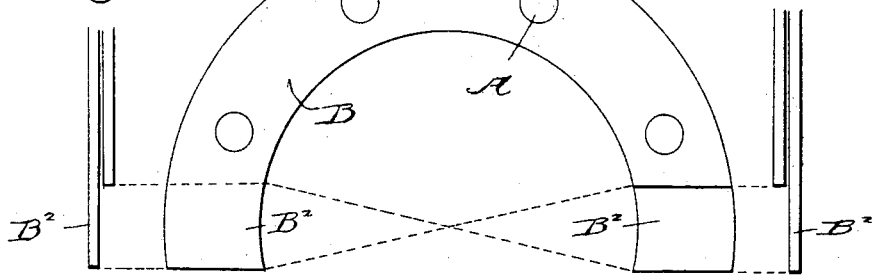
Witnesses:
Charles H. Roberts.
P. M. Hutchinson
Inventor:
Warren S. Belding
by Cyrus Kehr
Atty.

(No Model.) 5 Sheets—Sheet 2.
W. S. BELDING
DYNAMO.
No. 404,068. Patented May 28, 1889.
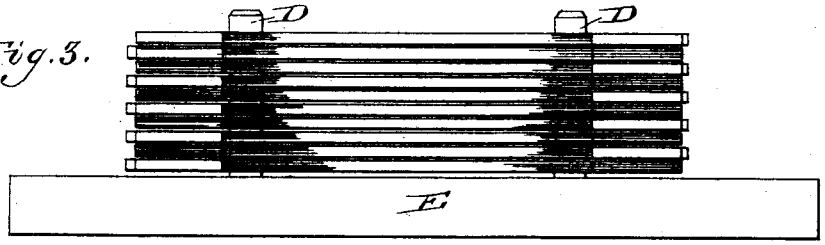
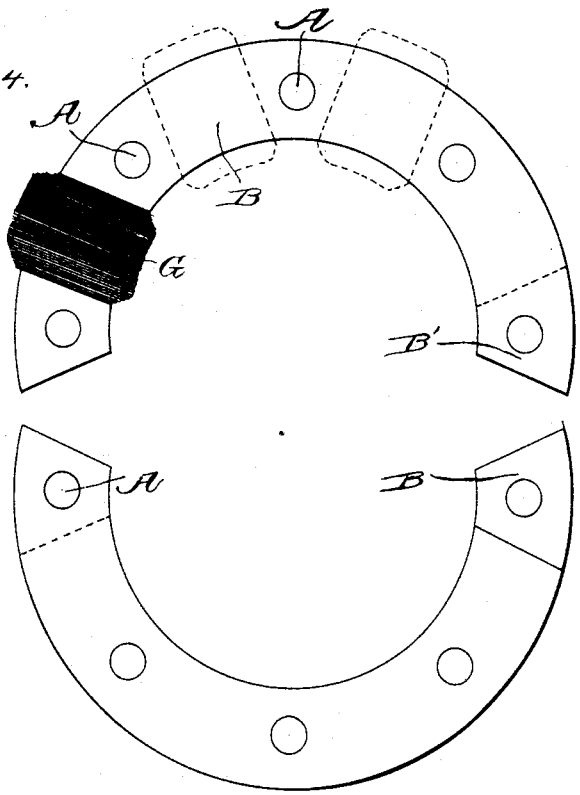
Witnesses:
Charles H. Roberts.
O. M. Hutchinson
Inventor:
Warren S. Belding
by Cyrus Kehr
Atty.

(No Model.) 5 Sheets—Sheet 3.

W. S. BELDING.
DYNAMO.

No. 404,068. Patented May 28, 1889.

Witnesses:
Charles H. Roberts.
P. M. Hutchinson

Inventor:
Warren S. Belding
by Cyrus Kehr
Atty (No Model.) 5 Sheets—Sheet 4.
W. S. BELDING.
DYNAMO.
No. 404,068. Patented May 28, 1889.
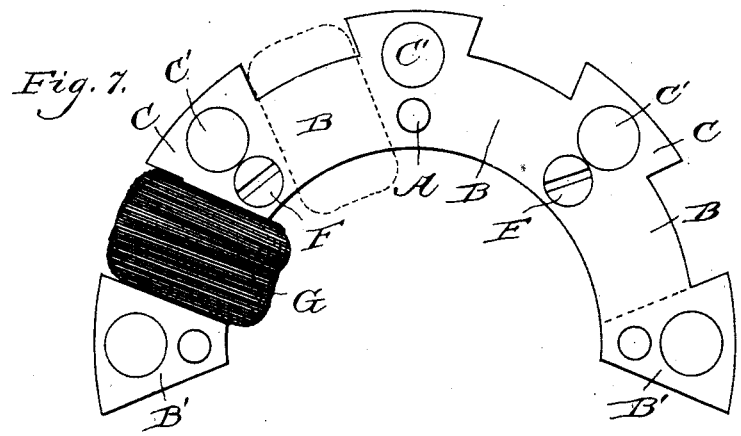
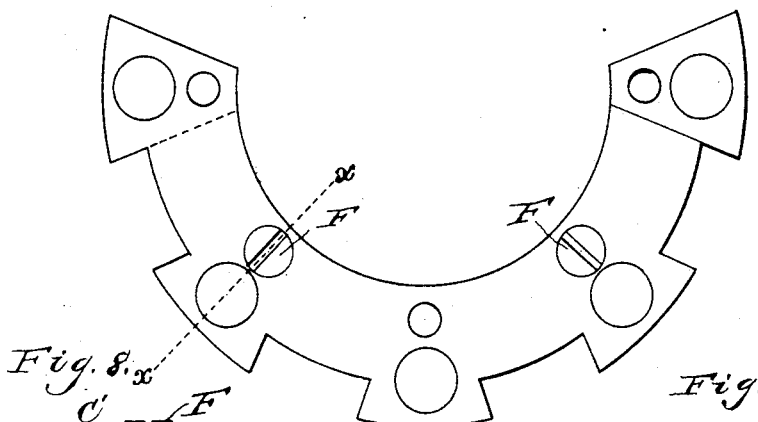
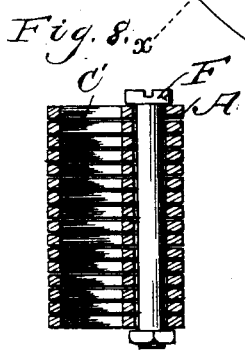
Witnesses:
Charles H. Roberts.
P. M. Hutchinson
Inventor:
Warren S. Belding
by Cyrus Kehr
Atty.

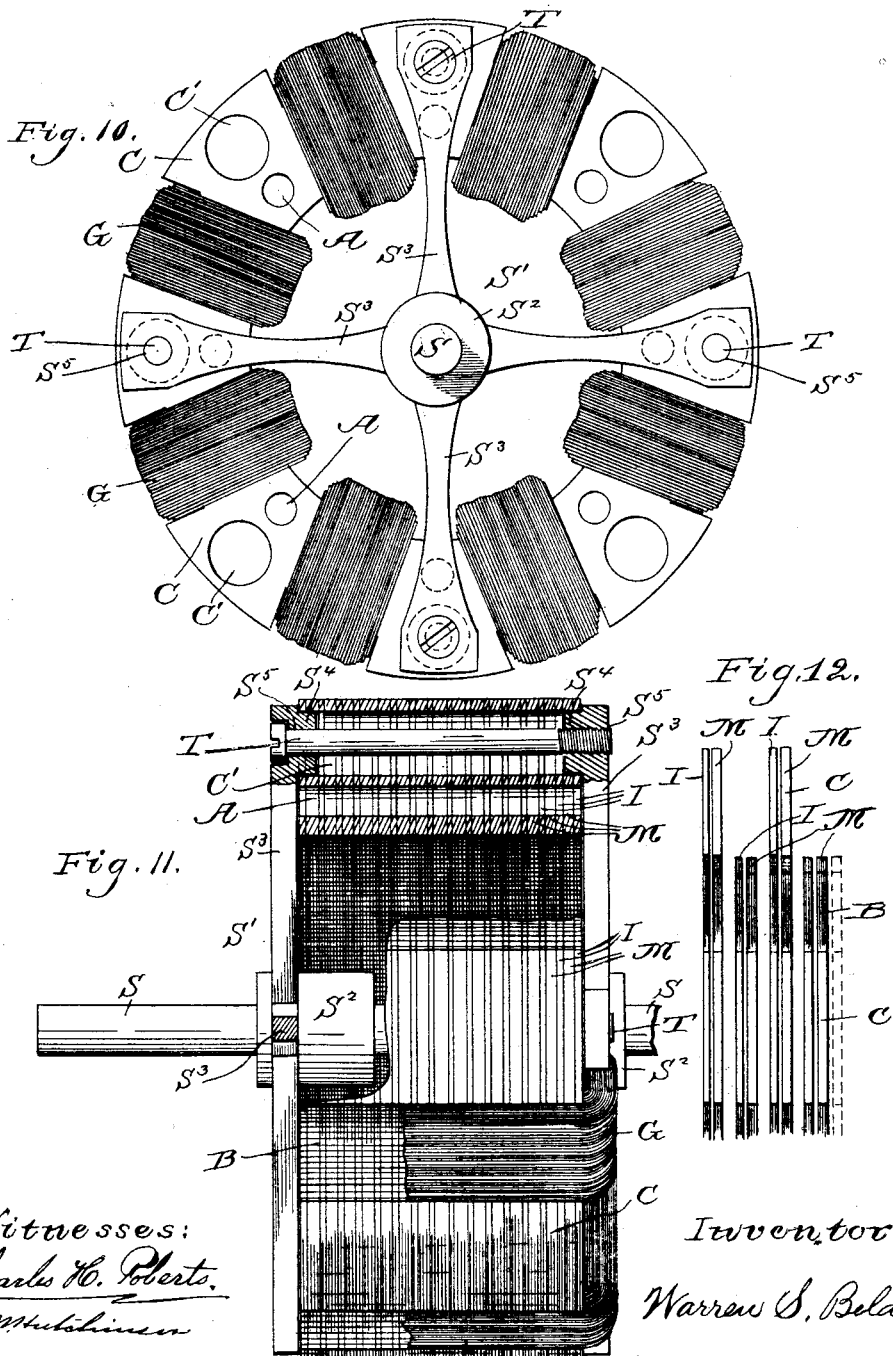

UNITED STATES PATENT OFFICE.

WARREN S. BELDING, OF CHICAGO, ILLINOIS, ASSIGNOR TO THE BELDING MOTOR AND MANUFACTURING COMPANY, OF SAME PLACE.

DYNAMO.

SPECIFICATION forming part of Letters Patent No. 404,068, dated May 28, 1889.

Application filed February 2, 1888. Serial No. 262,765. (No model.)

*To all whom it may concern:*

Be it known that I, WARREN S. BELDING, a citizen of the United States, residing at Chicago, in the county of Cook and State of Illinois, have invented certain new and useful Improvements in Armatures for Electric Motors and Dynamos; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to armatures for dynamo-electric machines and electric motors, which armatures are composed of segmental sections interlocked at their meeting ends and built up of blanks cut from sheets of material, as will be hereinafter fully described.

The invention relates, further, to the mounting of the armature upon its shaft.

Figure 5:
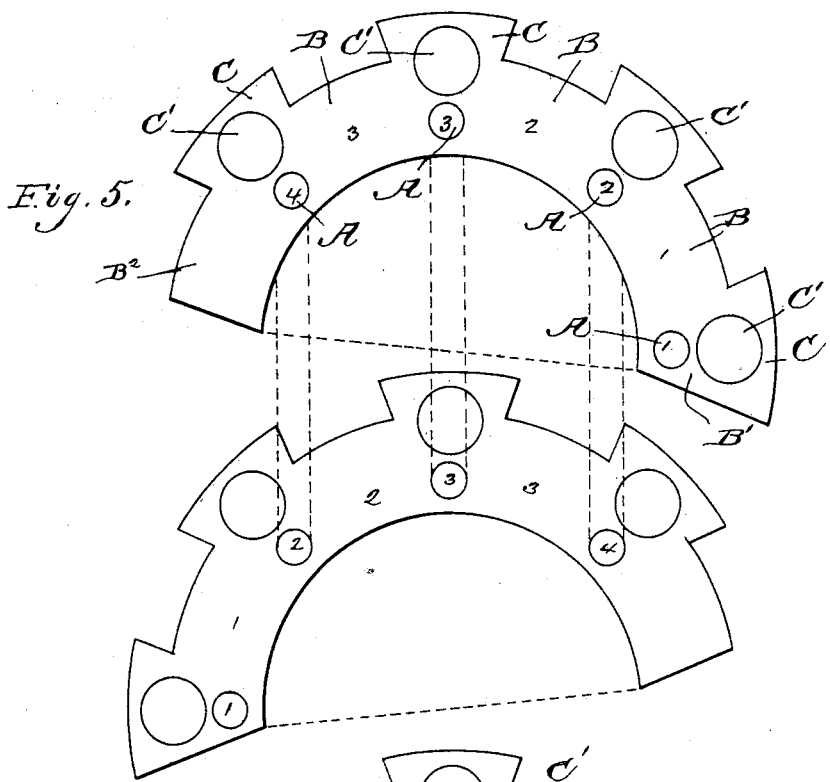
Figure 6:
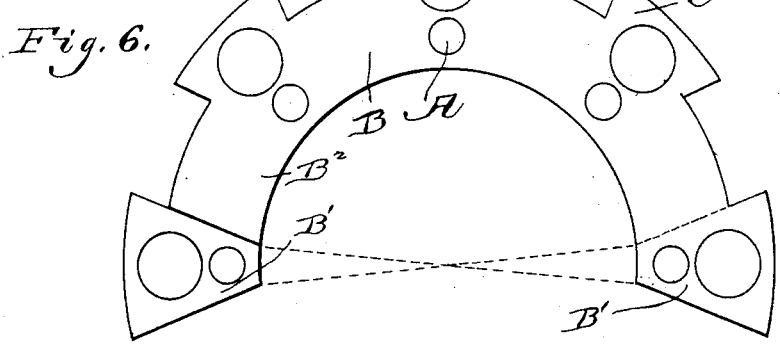

Referring to the accompanying drawings, Figure 1 is a view of two of the blanks used in building the armature, one being turned to the right and the other to the left. Fig. 2 is a view of said two blanks, one placed upon the other. Fig. 3 shows a rack used in building up the blanks with the blanks for one section of the armature upon it. Fig. 4 shows two sections forming halves of the armature, one being partially wound, and dotted lines indicating how they are to be further wound. Fig. 5 shows two of the blanks of another form. Fig. 6 shows said two blanks lying one upon the other. Fig. 7 shows two segments forming the halves of an armature built of the modified form of blank. Fig. 8 is a cross-section in line $x\,x$ of Fig. 7. Fig. 9 is an elevation of two interlocking ends of the segments separated from each other. Fig. 10 is an end elevation. Fig. 11 is a side elevation partially in section. Fig. 12 is a detail view.

An inspection of Fig. 1 will disclose a blank which is used in building the armature. Said blank is the half of a circle, and is divided into spaces by four equidistant holes, A, leaving between them the equal spaces B, and leaving at one end a short space, B', and at the other end a longer space, B², the sum of which last-named spaces is equal to one of the spaces B. The spaces B occupy a little greater arc than the segment-spaces of the armature, which are to be covered by the coils of wire. For convenience in description, I shall designate said spaces to be covered by the coils as the "bobbin-spaces." The space B² is so much shorter than the spaces B as to cause it to terminate opposite the adjacent hole coincident with the bobbin-space. The opposite end of the blank terminates at said bobbin-space. It may be said that this blank is unsymmetrical. Although the holes A are equidistant from each other, no two are equidistant from the center of the blank or from its ends. In other words, the group of holes is shifted laterally from one end of the blank toward the other. If two of the blanks are brought together with their dissimilar ends meeting—B' meeting B²—a complete circle is formed, and said circle is divided by eight equidistant holes into eight equal spaces, B and B' B².

For convenience in description, I designate the holes A by the serial numbers 1 2 3 4, beginning with the hole next B', and the spaces B by the serial numbers 1 2 3, beginning next B'. Now, if the two blanks be laid upon each other with similar ends in opposite directions and the hole 4 of the upper blank placed directly over hole 1 of the lower blank, then holes 3, 2, and 1 of the upper blank will be directly over holes 2, 3, and 4 of the lower blank. The spaces 1 2 3 of the upper blank will then lie over the spaces 3 2 1, respectively, of the lower blank, each of the spaces B² being partially covered by the spaces B', the remainder of each of said spaces B² being uncovered. Said uncovered part is equal to and coincident with the bobbin-space of that part of the circle in the finished armature. In other words, it occupies one of the segmental spaces to be covered by the coil. If I now apply upon the upper blank one that is reversed with reference to said upper blank and corresponds in position to said lower blank, and then place upon this third blank a fourth corresponding to the second, I have a sufficient number of blanks to complete one-half of an armature, and the number of blanks may be further increased indefinitely. Pins or bolts may be passed through the holes A to hold the blanks together during the operation of winding. The bobbin-spaces between the holes may now be wound. At each end of the half of the armatures spaces will be left between the parts B². In bringing the ends of the halves of the armature together to form a complete circle, the parts B² of one-half of the armature pass into the spaces between the parts B² of the adjacent end of the other half of the armature, and the two blanks forming the same circle lie in the same plane and abut. When the two halves of the armature have been thus united, it will be seen that the parts B² have formed two bobbin-spaces which are not yet wound with coils. These must then be wound by passing the wire through the armature; but the blanks may be so combined as to make all the bobbin-spaces complete before the two halves of the armature are united. All bobbin-spaces may, therefore, be wound before the halves of the armature are united. Upon this point attention is directed to Figs. 5 and 6. In said figures the holes 4, 3, and 2 of the upper blank are placed over holes 2, 3, and 4, respectively, of the lower blank. This brings the parts B² against spaces B, and leaves the portions B' and an equal portion of the adjacent spaces B uncovered. Blanks of the form shown in Fig. 1 may be applied to each other in this way. (See Fig. 4.)

The total of the uncovered ends of the blanks constitute the parts that interlock, and they are between two bobbin-spaces in the finished armature. The portions of the armature between the bobbin-spaces are the poles. In Figs. 5, 6, and 7 the poles are extended outwardly and the extension designated by the letter C. Each of said extensions of the poles is pierced by a hole, C', the purpose of which is, first, to form a pole in the finished armature of relatively large surface and small mass, whereby the magnetic effect in said pole is intensified; second, to form an opening through the pole to afford ventilation and thereby prevent heating.

The operation of building up the blanks to form one-half of an armature may be facilitated by using a device having two upright posts, D D, rising from a base, E, said posts being set from each other a distance equal to the distance between two of the holes A A, and being passed, for example, through holes A, 2, and 4 of one blank and through 4 and 2 of the next, and again through 2 and 4 of the next, and so on. When the blanks have been thus built up, bolts or pins F may be temporarily passed through the holes A to bind said blanks together until the coils G have been wound about the bobbin-spaces. By this arrangement of the plates the holes are brought over each other in the intermeshing poles or ends of the two halves of the armature.

As already explained, the holes A are equidistant and pass through the poles. The poles are therefore also equidistant. All the poles of the entire circle may, therefore, be equally distributed and of equal size, and it follows, also, that all the bobbin-spaces of the entire circle are equally distributed and of equal dimensions. The holes A, being located in the poles, are not covered by the coils. Consequently the bolts or pins F, uniting the blanks during the process of winding, may be removed after the winding has been accomplished and used again. Another advantage resulting from not covering the holes A by the winding is that they afford ventilation in the finished armature. Being formed in the poles, said holes A reduce the mass of material in the poles, whereby the magnetic effect in the remaining mass is intensified.

The holes, the poles, and the bobbin-spaces being thus respectively equal in distribution and dimensions, it results that there is a strictly even distribution of weight, pole-surface, and coils throughout the armature, and there is produced the highest possible degree of regularity of current and smoothness of motion.

In Figs. 11 and 12 I show the armature composed of two kinds of blanks. A portion—those marked M—are of metal, and the rest—those marked I—are of insulation material. The latter may be cut in the same dies as the former are, and may or may not be of the same thickness. They are interposed between the metal plates at suitable intervals to constitute non-conducting partitions between the metal blanks. This arrangement prevents the forming of eddy-currents in the iron and increases the magnetic effect in the poles, and consequently imparts greater efficiency of the armature when used in a motor.

Since the insulation-blanks are of the same form as the metal blanks, the two kinds may be applied alternately in building up the sections, or pairs composed of a metal blank and an insulation-blank may be applied alternately in building up the sections. In either case the insulation-blanks will extend into the interlocking ends of the sections and separate the metal there as well as elsewhere.

The winding of the armature may be much more rapidly done before the two halves are united. When the armature is a full circle, the winding must be done by passing the wire through the armature on a shuttle. If the separate halves are wound, they may be treated like spools—namely, by rotating them to take the wire.

The blanks may, obviously, be thirds or quarters or other divisions of a complete circle, provided they be so spaced as to build up with their ends abutting and form full and equal bobbin-spaces and poles.

The blanks are to be cut out of sheets of material, as already stated. This I intend to do by means of dies, and every blank for the same armatures, whether of metal or insulation material, may be cut in the same die.

The mounting of the armature upon the shafts by which it is rotated will be understood by an inspection of Figs. 10 and 11. S is said shaft, and S' S' are spiders, one of which is located on each side of the armature. S² is the hub of the spider, and S³ S³ are equidistant radial arms whose ends stand over the holes A or C'. In the drawings they stand over the latter. Each such end has on its inner face an extension, S⁴, which fits into the passage formed by the holes C' as a bushing. At one side of the armature a hole, S⁵, is bored through said end and the center of said bushing. At the other side of the armature the end of the spider-arm and the bushing are similarly bored and the bore threaded. Bolts T are passed through the non-threaded holes S⁵ and screwed into the threaded holes S⁵. These bolts may be turned until the armature is bound immovably between the two spiders.

It is to be observed that as soon as the bushings enter the passages formed by the holes C the armature becomes accurately centered upon the hub of the spider, and as the bolts hold the bushings in place the armature is always accurately centered and balanced. This is an essential in producing a motor or dynamo which shall have a smooth motion under high speed.

The bolt T is of less diameter than the passage formed by the holes C; consequently it is not in contact with the blanks M, so that the insulation between the latter is not disturbed. The extension S⁴ rests first against the outermost blank I, and is too short to touch two blanks M, and connect them electrically.

It is to be noted that the bushing and a slender bolt serve my purpose much better than a thick bolt alone would. If a bolt alone were used, it would have to be of a diameter equal to that of the passage formed by the holes C. In other words, the bolt would have to fit said passage tightly. It would then be so difficult to insert as to make this method substantially impracticable.

The head of the bolt T may be sunk into the arm of the spider, whereby the thickness of the finished armature is decreased, and the opposite end of the bolt may be provided with a nut; but by threading it into the arm of the spider the thickness of the finished armature is reduced.

The claims hereto appended are to be understood to apply to the armature and not to the individual plates or blanks used in constructing the armature. Said blanks are made the subject-matter of an application for Letters Patent filed by me January 24, 1888, Serial No. 261,779.

I claim as my invention—

1. An armature divided into bobbin-spaces and poles which are respectively equidistant and equal in dimensions, and each of which poles has a hole extending into or through it perpendicularly to the plane of the armature, whereby the exposed surface of the pole remains relatively large, while its mass is relatively small, substantially as and for the purposes herein specified.

2. An armature divided into bobbin-spaces and poles which are respectively equidistant and of equal dimensions, said poles being provided with outward extensions, into or through which extend holes perpendicularly to the plane of the armature, substantially as and for the purposes herein specified.

3. An armature consisting of alternate metal and insulation blanks and divided into bobbin-spaces and poles which are respectively equidistant and equal in dimensions, and each of which poles has a hole extending into or through it perpendicularly to the plane of the armature, whereby the exposed surface of the pole remains relatively large, while its mass is relatively small, substantially as and for the purposes herein specified.

4. An armature consisting of alternate metal and insulation blanks and divided into bobbin-spaces and poles which are respectively equidistant and of equal dimensions, said poles being provided with outward extensions, into or through which extend holes perpendicularly to the plane of the armature, substantially as and for the purposes herein specified.

5. An armature composed of two or more interlocking sections, said sections being composed of sheet-blanks each of which is a segment of a circle and divided into bobbin-spaces and poles which are respectively equal in dimensions and equidistant from each other and located unsymmetrically on said blank, so that there is a bobbin-space at one end of the blank and a pole at the other end, substantially as and for the purposes herein specified.

6. An armature composed of two or more interlocking sections, said sections being composed of sheet-blanks each constituting a segment of a circle and divided into bobbin-spaces and poles which are respectively equal in dimensions and equidistant from each other and located unsymmetrically on said blank, so that there is a bobbin-space at one end of the blank and a pole at the other end, each of said poles having formed in it a hole, substantially as and for the purposes herein specified.

7. An armature composed of two or more interlocking sections, said sections being composed of sheet-blanks each of which is a segment of a circle and divided into bobbin-spaces and poles which are respectively equal in dimensions and equidistant from each other and located unsymmetrically on said blank, so that there is a bobbin-space at one end of the blank and a pole at the other end, and said poles having each an outward extension, substantially as and for the purposes herein specified.

8. An armature composed of two or more interlocking sections, said sections being composed of sheet-blanks each of which is a segment of a circle and divided into bobbin-spaces and poles which are respectively equal in dimensions and equidistant from each other and located unsymmetrically on said blank, so that there is a bobbin-space at one end of the blank and a pole at the other end, and said poles having each an outward extension, and each such extension having formed in it a hole, substantially as and for the purposes herein specified.

9. An armature composed of two or more interlocking sections, said sections being composed of metal sheet-blanks M and insulation-blanks I, each of which is divided into bobbin-spaces and poles which are respectively equal in dimensions and equidistant from each other and located unsymmetrically on said blank, so that there is a bobbin-space at one end of the blank and a pole at the other end, substantially as and for the purposes herein specified.

10. An armature divided into bobbin-spaces and poles which are respectively equidistant and equal in dimensions, and each of which poles has a hole extending through it perpendicularly to the plane of the armature, and spiders S', located at each side of the armature, bolts T, extending through said holes and the spiders, and a shaft, S, extending through said spiders, substantially as described.

11. The combination, with an armature having holes extending through the armature between the bobbin-spaces B B, of a shaft, S, a spider, S', located on said shaft at each side of the armature and having bushings S⁴, extending into said holes, and bolts T, extending through said holes and bushings and the arms of the spiders, substantially as and for the purposes specified.

12. The combination, with an armature divided into bobbin-spaces and poles which are respectively equidistant and equal in dimensions and having holes A and C' extending through the armature between the bobbin-spaces perpendicularly to the plane of the armature, of a shaft, S, a spider, S', located on said shaft at each side of the armature, and bolts T, extending through one of the spider-arms and the armature and threaded into the opposite spider-arm, substantially as and for the purposes herein set forth.

13. The combination, with an armature having holes A and C' extending through the armature between the bobbin-spaces B B, of a shaft, S, a spider, S', located on said shaft at each side of the armature and having bushings S⁴ extending into said holes, and bolts T, extending through one of the arms of said spider and the bushing thereon and through one of said holes and threaded into the opposite bushing and spider-arm, substantially as shown and described.

14. The combination, with an armature composed of two or more interlocking sections, said sections being composed of sheet-blanks each of which is a segment of a circle and divided into bobbin-spaces and poles which are respectively equal in dimensions and equidistant from each other and located unsymmetrically on said blank, so that there is a bobbin-space at one end of the blank and a pole at the other end, of spiders applied to the sides of said armature, and a shaft extending through the center or axis of said armature and said spiders, substantially as shown and described.

In testimony whereof I affix my signature in presence of two witnesses.

WARREN S. BELDING.

Witnesses:
L. VERNON FERRIS,
CYRUS KEHR.